(12) United States Patent
Isaac et al.

(10) Patent No.: US 11,839,176 B2
(45) Date of Patent: Dec. 12, 2023

(54) FEEDER CONVEYOR VARIABLE TENSIONER

(71) Applicant: CNH Industrial America LLC, New Holland, PA (US)

(72) Inventors: Nathan E. Isaac, Lancaster, PA (US); Steven E. Gaedy, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 18/026,938

(22) PCT Filed: Sep. 14, 2021

(86) PCT No.: PCT/US2021/050268
§ 371 (c)(1),
(2) Date: Mar. 17, 2023

(87) PCT Pub. No.: WO2022/060731
PCT Pub. Date: Mar. 24, 2022

(65) Prior Publication Data
US 2023/0255142 A1  Aug. 17, 2023

Related U.S. Application Data

(60) Provisional application No. 63/079,588, filed on Sep. 17, 2020.

(51) Int. Cl.
*A01D 61/00* (2006.01)
*A01D 61/02* (2006.01)
*B65G 23/44* (2006.01)

(52) U.S. Cl.
CPC .......... *A01D 61/008* (2013.01); *A01D 61/02* (2013.01); *B65G 23/44* (2013.01); *B65G 2203/0266* (2013.01)

(58) Field of Classification Search
CPC ...... A01D 61/008; A01D 61/02; B65G 23/44; B65G 2203/0266
See application file for complete search history.

(56) References Cited

U.S. PATENT DOCUMENTS 2,312,838 A * 3/1943 Johnston .............. A01D 61/008
460/70
3,118,315 A * 1/1964 Loosli ....................... F16H 7/14
198/816

(Continued)

FOREIGN PATENT DOCUMENTS

| CN | 1576194 A | * | 2/2005 | ............. B65G 23/44 |
| CN | 106185242 A | * | 12/2016 | ............. B65G 43/02 |

(Continued)

OTHER PUBLICATIONS

International Search Report and Written Opinion for PCT Application No. PCT/US2021/050268 dated Dec. 20, 2021 (15 pages).

*Primary Examiner* — Arpad F Kovacs
(74) *Attorney, Agent, or Firm* — Peter K. Zacharias (57) ABSTRACT

A feeder conveyor system having a frame, an actuator with a fixed element and a moving element, and a telescoping assembly. The telescoping assembly has a first member having a first end connected to an actuator output and a first spring seat, and a second member slidably connected to the first member and having a second end and a second spring seat. The second member is movable relative to the first member between a retracted position in which the second end is relatively close to the first end, and an extended position in which the second end is relatively far from the first end, a spring between the first spring seat and the second spring seat, a linkage between the first member and the second member, and a position sensor connected to the (Continued)

linkage and configured to generate a signal indicating a relative position between the first and second members.

20 Claims, 4 Drawing Sheets

(56) References Cited

U.S. PATENT DOCUMENTS

| | | | |
|---|---|---|---|
| 3,809,832 A | 5/1974 | Burger | |
| 4,362,005 A * | 12/1982 | Hanaway | B65G 23/44 |
| | | | 56/DIG. 15 |
| 4,421,228 A * | 12/1983 | Marsiglio | B65H 23/02 |
| | | | 198/840 |
| 4,508,213 A | 4/1985 | Kelley | |
| 4,655,907 A | 4/1987 | Ando | |
| 4,803,804 A * | 2/1989 | Bryant | F16H 7/1263 |
| | | | 198/813 |
| 5,156,261 A * | 10/1992 | Dorner | B65G 39/16 |
| | | | 198/816 |
| 6,116,008 A * | 9/2000 | Digman | A01D 61/008 |
| | | | 56/15.8 |
| 6,202,397 B1 * | 3/2001 | Watts | A01D 61/002 |
| | | | 56/208 |
| 6,312,329 B1 * | 11/2001 | Digman | A01F 12/16 |
| | | | 460/105 |
| 7,600,362 B2 * | 10/2009 | Wernsmann | A01D 61/008 |
| | | | 56/16.6 |
| 8,851,276 B2 | 10/2014 | Strieker | |
| 9,301,450 B2 * | 4/2016 | Boyd | A01D 61/008 |
| 9,485,915 B2 * | 11/2016 | Rittershofer | A01F 12/46 |
| 9,643,786 B1 * | 5/2017 | Palmer | B65G 23/44 |
| 9,738,453 B2 | 8/2017 | Cerny et al. | |
| 10,071,862 B1 * | 9/2018 | Barry | G01L 5/0057 |
| 10,945,373 B2 * | 3/2021 | Donohoe | A01F 12/10 |
| 11,497,166 B2 * | 11/2022 | Reubens | A01D 41/16 |
| 2010/0270128 A1 * | 10/2010 | Hill | B65G 23/44 |
| | | | 198/810.04 |
| 2013/0105282 A1 * | 5/2013 | Hoffman | A01D 57/20 |
| | | | 198/814 |
| 2013/0277178 A1 * | 10/2013 | Strieker | A01D 61/02 |
| | | | 198/813 |
| 2014/0124336 A1 * | 5/2014 | Domenicucci | A21B 3/00 |
| | | | 198/810.02 |
| 2017/0297825 A1 * | 10/2017 | Watson | E21F 13/066 |
| 2018/0332772 A1 * | 11/2018 | Fuechtling | A01D 34/14 |
| 2019/0367286 A1 | 12/2019 | Engelmann et al. | |
| 2019/0380273 A1 * | 12/2019 | Mossman | A01D 57/20 |
| 2020/0000038 A1 * | 1/2020 | Coppinger | F16H 31/001 |
| 2020/0087076 A1 * | 3/2020 | Watson | B65G 23/44 |

FOREIGN PATENT DOCUMENTS

| | | | |
|---|---|---|---|
| CN | 111153120 A * | 5/2020 | B65G 23/06 |
| DE | 4413321 A1 * | 10/1995 | B65D 23/44 |
| DE | 102004061112 A1 | 6/2006 | |
| DE | 102008021784 A1 * | 11/2009 | A01D 61/02 |
| EP | 1040750 A1 | 10/2000 | |
| EP | 2842409 A1 * | 3/2015 | A01D 61/008 |
| EP | 3590321 A1 | 1/2020 | |
| GB | 2042453 A * | 9/1980 | B65G 23/44 |
| GB | 2346663 A * | 8/2000 | B65G 23/44 |
| WO | 2011/108984 A1 | 9/2011 | |

* cited by examiner

FEEDER CONVEYOR VARIABLE TENSIONER

BACKGROUND OF THE INVENTION

Agricultural combines are machines that gather crop materials and separate the desirable crop (grain, seeds, etc.) from the discardable material (straw, tailings, etc.). To do so, the combine typically collects all of the crop materials using a system including a header and a feeder. The header gathers a wide swath of materials from the ground, and moves them towards the feeder. The feeder conveys the consolidated crop materials to the threshing and separating system, which separates the desirable crop from the remaining material.

A typical feeder includes a conveyor system that must move all of the crop material that passes through the combine. Thus, the feeder assembly usually has chains that drive slats to move the crop material. Normal wear causes such chains to permanently stretch. In addition, support members, such as drive sprockets, also experience wear that can reduce their effective diameter or spacing. Such stretching and wear causes the chain to loosen over time. Thus, the chains and supports must be periodically serviced or replaced.

A typical chain drive system has two chain supports, such as a front drum and a rear drive sprocket assembly, and some version of a tensioner to maintain tension in the chains. For example, the drum may be movably mounted to the feeder housing frame, to allow the entire drum to be moved towards and away from the drive sprocket assembly to maintain the chains in proper tension. A typical system for making such adjustments is to mount each end of the drum to the frame via draw bolts with springs. The springs are adjusted by turning the draw bolts to set the desired tension across the chain assembly.

Such chain drive tensioning systems require manual intervention to maintain the desired chain tension. This adds to the service cost of the equipment, and can result in an oversight of unexpectedly high wear between regular service intervals. Thus, the inventors have determined that the state of the art of feeder chain systems can be improved.

This description of the background is provided to assist with an understanding of the following explanations of exemplary embodiments, and is not an admission that any or all of this background information is necessarily prior art.

SUMMARY

In a first exemplary aspect, there is provided a feeder conveyor system comprising: a frame; an actuator having a fixed element attached at a mounting point to the frame, and a movable element having an output interface, the movable element being connected to the fixed element and movable between a retracted actuator position in which the output interface is relatively close to the mounting point, and an extended actuator position in which the output interface is relatively far from the mounting point; and a telescoping assembly. The telescoping assembly has: a first member having a first end connected to the output interface to move with the output interface, and a first spring seat, a second member slidably connected to the first member and having a second end and a second spring seat, the second member being movable relative to the first member between a retracted telescoping assembly position in which the second end is relatively close to the first end, and an extended telescoping assembly position in which the second end is relatively far from the first end, a spring operatively connected between the first spring seat and the second spring seat, a linkage operatively connected between the first member and the second member, and a position sensor operatively connected to the linkage and configured to generate an output signal indicative of a relative position between the first member and the second member.

In some examples, the feeder conveyor system further includes a first flexible drive support assembly movably mounted to the frame and connected to the second end of the second member to move with the second member.

In some examples, the feeder conveyor system further includes a second flexible drive support assembly attached to the frame at a second mounting point, and a continuous flexible drive assembly extending around the first flexible drive support assembly and the second flexible drive support assembly.

In some examples, the first flexible drive support assembly comprises a drum, the second flexible drive support assembly comprises a plurality of first sprockets, the continuous flexible drive assembly comprises a plurality of continuous chains, each extending around a respective one of the plurality of first sprockets and the drum, and the continuous flexible drive assembly comprises a plurality of slats, each of the plurality of slats being connected to at least two of the plurality of continuous chains.

In some examples, the actuator comprises a hydraulic actuator and one of the fixed element and the movable element comprises a cylinder and the other of the fixed element and the movable element comprises a piston having an end slidably movable with an end of the piston in the cylinder.

In some examples, the feeder conveyor system further includes a travel stop positioned to stop relative movement of the first member relative to the second member at the retracted telescoping assembly position.

In some examples, the spring comprises a coil spring having a minimum collapsed length, and the travel stop is positioned to prevent a distance between the first spring seat and the second spring seat from being less than the minimum collapsed length.

In some examples, the linkage comprises a first link, a second link, a first pivot joining the first link to one of the first member and the second member, a second pivot joining the first link to the second link, and a third pivot joining the second link to the other of the first member and the second member.

In some examples, the position sensor comprises a potentiometer connected between the first link and the one of the first member and the second member and wherein the output signal comprises a voltage value that varies corresponding to an angular orientation of the first link relative to the one of the first member and the second member.

In some examples, the feeder conveyor system further includes a controller configured to operate the actuator based on the output signal.

In some examples, the controller is configured to operate the actuator to maintain a distance between the first spring seat and the second spring seat at a constant value.

In another exemplary embodiment, there is provided an agricultural vehicle comprising: a chassis configured for movement on a surface; a header configured to gather crop material from the surface; and a feeder assembly as described in the foregoing exemplary embodiment and examples operatively connected between the header and the chassis and configured to convey the crop material from the header to the chassis.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

The terms "forward," "rearward," "left," and "right", when used in connection with the agricultural harvester (e.g. combine) and/or components thereof are usually determined with reference to the direction of forward operative travel of the combine, but they should not be construed as limiting. The terms "longitudinal" and "transverse" are determined with reference to the fore-and-aft direction of the agricultural combine and are also not to be construed as limiting.

The drawings depict one or more exemplary and non-limiting implementations in accordance with the present concepts. The examples are shown in conjunction with an agricultural combine harvester, but have applicability in any similar agricultural vehicle, such as a windrower or other equipment having a feeder chain or flexible drive assembly.

Figure 1:
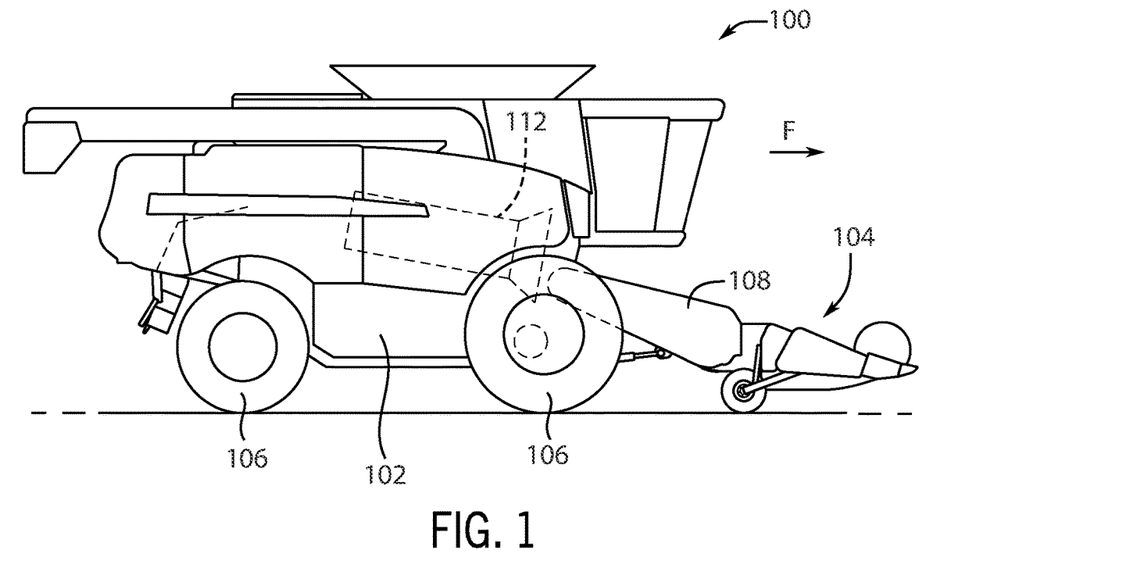
FIG. 1 illustrates an exemplary agricultural harvester.

FIG. 1 shows an exemplary embodiment of an agricultural vehicle 100 in the form of a combine harvester. The vehicle 100 generally includes a chassis 102 and a header 104 carried by the chassis 102. The chassis 102 is supported on driving wheels 106 (e.g., tracked wheels or pneumatic tires), as known in the art. The vehicle 100 is configured to move in a forward direction, illustrated as arrow F, during harvesting operations.

Figure 2:
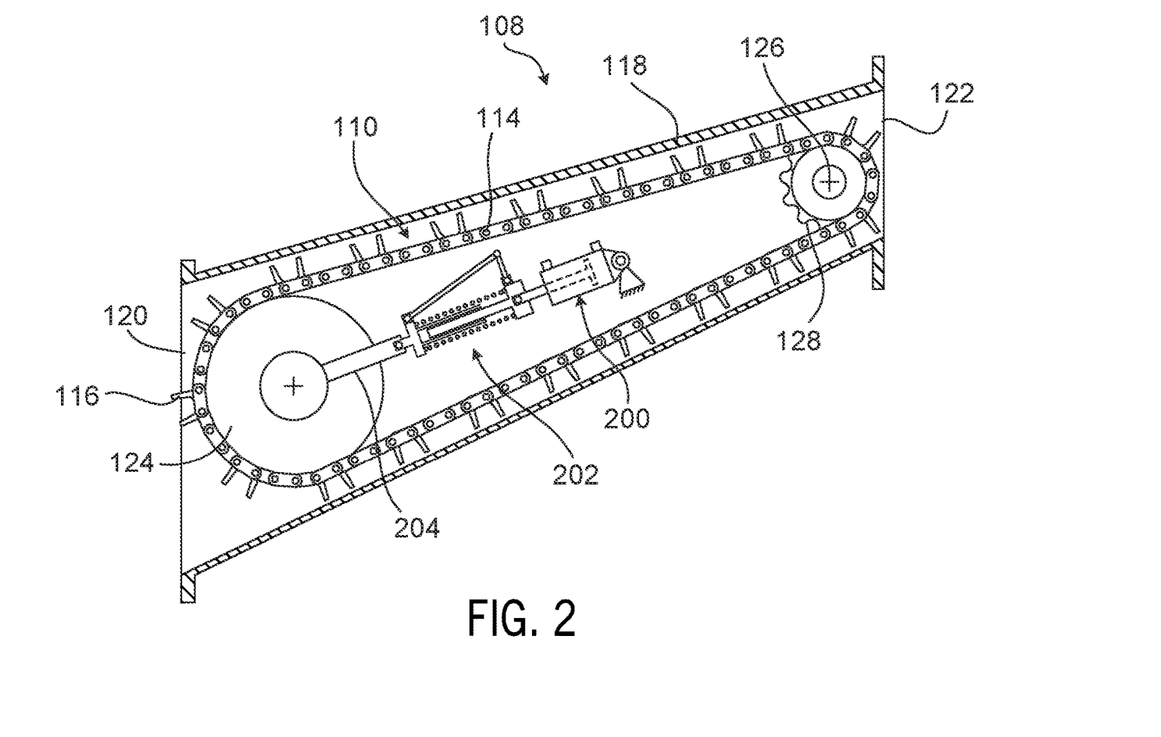
FIG. 2 is a partially cutaway side view of an exemplary feeder assembly.
Figure 3:
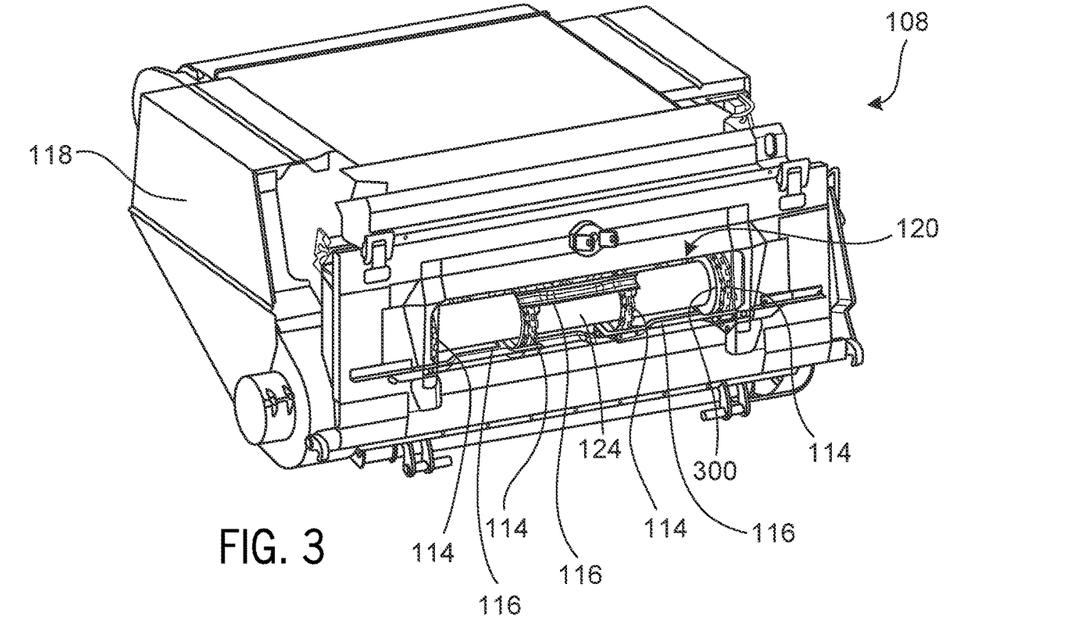
FIG. 3 is an isometric view of an exemplary feeder assembly.

The header 104 is connected to the chassis 102 by a feeder assembly 108, which is shown in more detail in FIGS. 2 and 3. The feeder assembly 108 includes a conveyor 110 configured to collect crop material and direct it to a threshing and separating system 112 inside the vehicle 100. The feeder assembly 108 described and illustrated herein does not necessarily need to be included on a combine harvester, but can be incorporated in other agricultural vehicles. The feeder assembly 108 may be rigidly connected to the chassis 102, or connected by an articulating connection having one or more pivots, linkage arms and/or actuators (e.g., hydraulic pistons/cylinder actuators) that operate as position control mechanisms. Such connections and actuators are known in the art, and need not be described in detail herein.

As shown in FIGS. 2 and 3, the exemplary conveyor 110 comprises a plurality of chains 114 that support a plurality of slats 116. Each slat 116 is attached to at least two of the chains 114. The chains 114 and slats 116 are contained within a housing 118. The housing 118 extends from an inlet opening 120 at the header 104, to an outlet opening 122 at the chassis 102. The conveyor 110 is supported adjacent the inlet opening 120 by a front flexible drive support assembly, such as a front drum 124, and at the rear opening 122 by a rear flexible drive support assembly, such as a topshaft 126 having sprockets 128 that engage the links of the chains 114. The sprockets 128 are connected to the topshaft 126 to transmit rotational torque between the chains 114 and the topshaft 126. The topshaft 126 may be directly driven by a motor and gearbox (not shown), or it may be an unpowered idler shaft. In FIG. 2, only one chain 114 and sprocket 128 are visible, but it will be understood that a separate sprocket typically will be provided for each chain 114. The drum 124 optionally also may include sprockets 300 or tooth-like features or chain guides, or the drum 124 may be replaced by an assembly similar to the topshaft 126. In use, the topshaft 126 or drum 124 is driven by a motor to drive the chains 114 and move the slats 116 along the feeder housing 118. The slats 116 cooperate with the inner wall of the housing 118 to carry crop material from the inlet opening 120 to the rear opening 122.

The illustrated chains 114, sprockets 128 and the like may be replaced, in some instances, with V-belts, poly-V belts, cogged belts, or other flexible drive members. Such flexible drive members may engage suitable pulleys or cog wheels. Such variations are known in the art, and it will be understood that references herein to "chains" and "sprockets" and the like also refer to alternative flexible drive members like the belts mentioned above.

The feeder conveyor system also includes an adjustment mechanism having an actuator 200 and a telescoping assembly 202. The telescoping assembly 202 is attached between the actuator 200 and one of the flexible drive support assemblies. In the shown example, the telescoping assembly 202 is attached to the drum 124 by arms 204. In other cases, the arms 204 may be omitted or replaced by other structures, and the telescoping assembly 202 can alternatively be connected between the actuator 200 and the rear flexible drive support assembly. The feeder conveyor system also may include a single adjustment mechanism or multiple adjustment mechanisms. For example, a single actuator 200 and telescoping assembly 202 may be connected to simultaneously control both ends of the drum 124, a single actuator 200 may be connected to separate telescoping assemblies 202 at each end of the drum 124, or a separate actuator 200 and telescoping assembly 202 may be provided at each lateral side of the feeder assembly 108 to separately control the position of each end of the drum 124.

Figure 4:
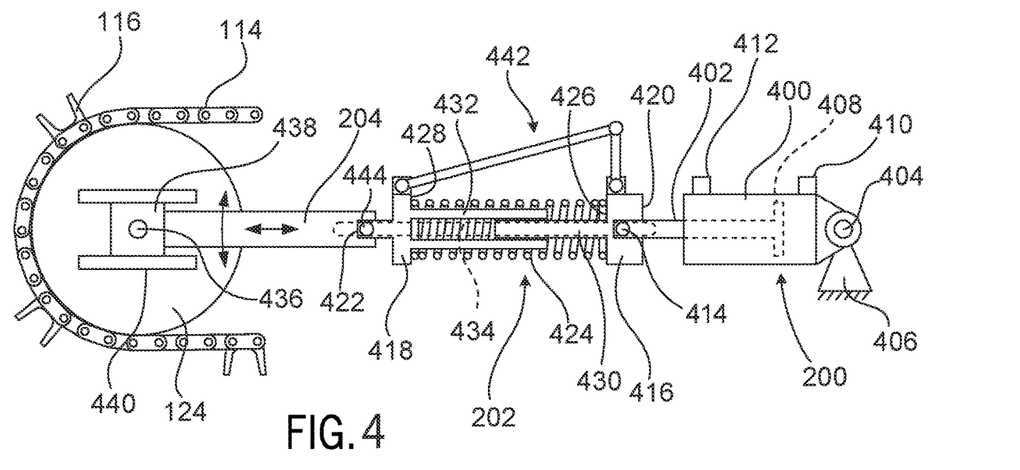
FIG. 4 is a schematic view of an exemplary tensioner system for a feeder assembly.
Figure 5:
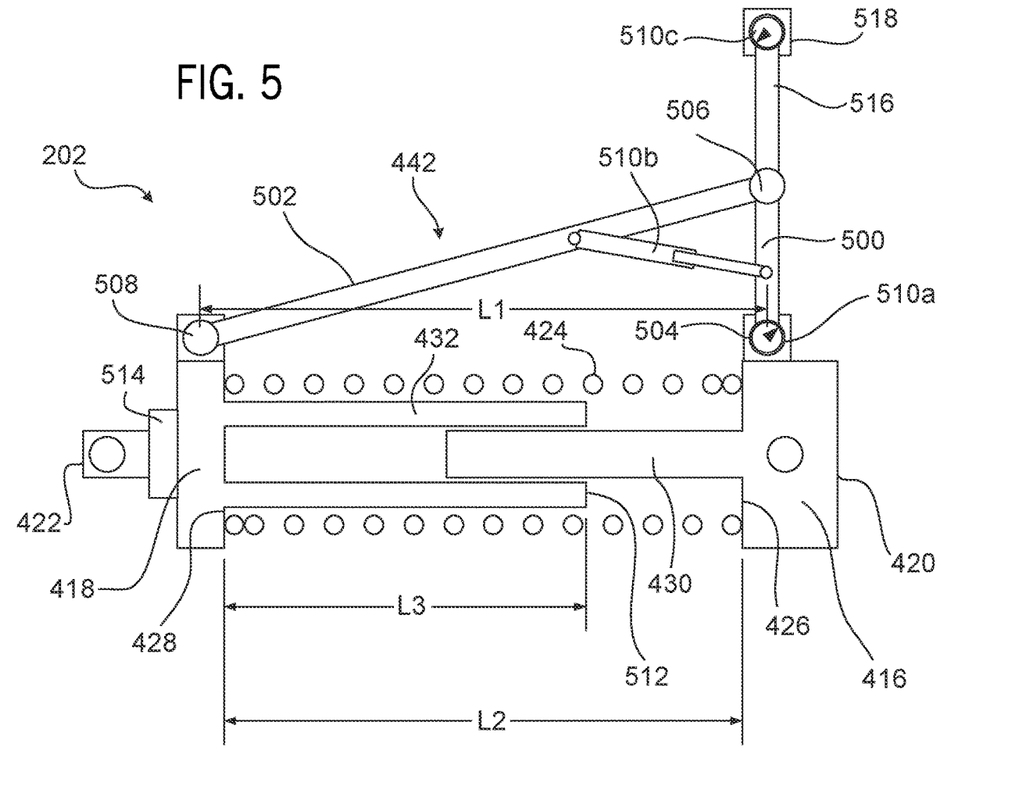
FIG. 5 shows the exemplary telescoping assembly of FIG. 4 in more detail.

Details of the actuator 200 and telescoping assembly 202 are illustrated in FIGS. 4 and 5.

In general terms, the actuator 200 comprises a fixed element and a movable element that can be articulated relative to each other to provide controlled movement. In the shown example, the fixed element is a hydraulic cylinder 400, and the movable element is a hydraulic piston 402. The cylinder 400 is attached at a mounting point 404, such as a pin, to the feeder assembly frame 406 (e.g., to a collar or bearing secured to the feeder housing 118). The piston 402 is slidably mounted to the cylinder 400, with the head 408 of the piston 402 being retained inside the cylinder 400. The cylinder 400 may be a double-acting cylinder, having a first hydraulic input 410 on one side of the piston head 408 and a second hydraulic input 412 on the other side of the piston head 408, to thereby selectively apply hydraulic pressure to extend and retract the piston 402. The piston 402 has an output interface 414, such as a pin or threaded connector. Application of hydraulic fluid to the first and second hydraulic inputs 410, 412 causes the piston 402 to move between a retracted actuator position in which the output interface 414 is relatively close to the mounting point 404, and an extended actuator position in which the output interface 414 is relatively far from the mounting point 404.

The actuator 200 may be modified in various ways. For example, the piston 402 may be configured as the fixed element and the cylinder 400 may be configured as the movable element by simply reversing their positions. As another example, the double-acting hydraulic cylinder 400 may be replaced by a single-acting hydraulic cylinder, which may include a return spring. The actuator 200 also may be replaced with a hydraulic or electric motor-driven lead screw or rack and pinion arrangement, or other types of motion control devices. Actuators 400 such as the foregoing are known in the art, and details and additional variations thereof need not be described in further detail herein.

The telescoping assembly 202 generally includes a first member 416, and a second member 418 that is slidably connected to the first member 416. The first member 416 defines a first end 420 of the telescoping assembly 202, and the second member 418 defines a second end 422 of the telescoping assembly 202. A spring 424 is retained between a first spring seat 426 on the first member 416 and a second spring seat 428 on the second member 418. The spring 424 preferably is a coil spring, but other types of spring may be used. The spring seats 426, 428 are shaped to abut the ends of the spring 424 in a manner to transfer axial forces between the spring seats 426, 428 and the spring 424. For example, the spring seats 426, 428 may comprise flat surfaces that extend perpendicular to the axis of the spring 424, or they may include surfaces that are shaped to receive coils of the spring 424. The spring seats 426, 428 also may include centering cones or other structures to prevent the spring 424 from moving out of position.

The first member 416 and second member 418 may be connected such that they are movable relative to each other between a retracted telescoping assembly position in which the second end 422 is relatively close to the first end 420, and an extended telescoping assembly position in which the second end 422 is relatively far from the first end 420. For example, the first member 416 may have a rod 430 that fits into a corresponding bore 432 in the second member 418 to provide a piston/cylinder type sliding connection. In other embodiments, the rod 430 and bore 432 may be replaced by sliding tracks, linkages, or other structures.

The exemplary telescoping assembly 202 is operatively connected between the actuator 200 and the flexible drive assembly support drum 124. More specifically, the output interface 414 of the actuator 200 is attached to the first end 420 of the telescoping assembly 202, and the second end 422 of the telescoping assembly 202 is attached to the drum 124. Such connections may be by any suitable mechanism, such as pins, bolts, threaded connection, weldments, or the like. The connections may be rigid, but more preferably have one or more degrees of freedom to allow some relative movement between the parts. For example, the shown connections are by pins that allow rotation at each connection about one or more axes to accommodate slight misalignments of the parts during use. The pins or other connections may include features to prevent the parts from deviating from their desired travel paths. For example, the pins used at the ends of the telescoping assembly 202 may extend laterally to fit into one or more guide slots 434. Such guide slots 434 may be formed in or attached to the housing frame 406 to provide a stable track for controlling the movement of the pins. Other alternatives and variations will be apparent to persons of ordinary skill in the art in view of the present disclosure.

The telescoping assembly 202 may be attached to the drum 124 using any suitable connection to provide two-way force transfer between the second end 422 and the drum 124. The connection may be direct, or by way of intervening parts, such as an arm 204 or the like.

The drum 124 is movably mounted to the feeder assembly frame 406 to allow repositioning to add or remove tension from the chains 114 or other flexible drive members (e.g., belts, as discussed above). For example, each end of the drum 124 may be mounted by its axle 436 and a suitable bearing or bushing (not shown) to a slider 438 that moves within a respective track 440 affixed to the feeder housing frame 406. Similarly, a pin 444 joining the second end 422 of the telescoping assembly 202 to the arm 204 may slide within one of the aforementioned guide slots 434. The slider 438 and track 440 are configured to allow the drum 124 to move towards and away from the topshaft 126, or whatever other structure is used to hold the other end of the chains 114. Such motion is indicated by the double-headed left-right arrow in FIG. 4. The drum axle 436 also may be mounted for vertical movement to account for different harvesting conditions, such by being pivotable about pin 444, as shown by the up-down arrow in FIG. 4.

From the foregoing, it will be clear that the actuator 200 is operable to move the drum 124 to add or remove tension to the chains 114. Adding tension is done by adding hydraulic fluid to the first hydraulic input 410 to extend the piston 402 and increase the distance between the mounting point 404 and the output interface 414 (i.e., move the actuator 200 towards the extended actuator position). As the piston 402 extends, it generates a force that moves the first member 416 of the telescoping assembly 202 against the spring 424, and the spring 424 transfers this force to the second member 418. If the chains 114 are slack, the force on the second member 418 will move the drum 124 to take up the slack and eventually begin adding tension to the chains 114. Once the slack is removed, the amount of chain tension can be adjusted by changing the position of the piston 402 to apply more or less force to the spring 424.

The amount of static tension applied to the chains 114 can be estimated based on the properties of the spring 424. In particular, the tension can be estimated by comparing the instantaneous length of the spring with the spring rate and free length of the spring 424. The spring rate and free length can be selected during the design process, and typically do not change during normal use. However, the instantaneous length varies depending on the relative positions of the first member 416 and the second member 418. The position of the first member 416 varies depending on the operating position of the actuator 200, and may be influenced by factors such as hydraulic oil temperature. The position of the second member 418 depends on the position of the first member 416, the spring properties, operating loads that tend to drive the second member 418 towards the first member 418 (e.g., increased dynamic tension on the chain when encountering heavy crop material loads), chain length (a function of chain stretch), and dimensional variations caused by wear on other parts such as the sprockets 128 and drum 124.

It has been determined that the various factors affecting instantaneous spring length can be accounted for in a relatively simple way by using a linkage 442 extending between the first member 416 and the second member 418 to monitor the actual spring length during operation of the feeder assembly 108. Details of an exemplary linkage 442, and other exemplary aspects of a telescoping assembly 202, are shown in FIG. 5.

The exemplary linkage 442 is a two-bar linkage having a first link 500, a second link 502, a first pivot 504 joining the first link 500 to the first member 416, a second pivot 506 joining the first link 500 to the second link 502, and a third pivot 508 joining the second link 502 to the second member 418. The links and pivots may comprise rods connected by pivot pins, or other suitable assemblies.

The linkage 442 is configured such that the links 500, 502 assume predetermined orientations—with respect to each other, and with respect to the first and second members 416, 418—as a function of a first distance L1 between the first pivot 504 and the third pivot 508. The first distance L1 is proportional to a second distance L2 between the first spring seat 426 and the second spring seat 428. When the telescoping assembly 202 is under compression (i.e., no slack in the chains 114), the spring 424 abuts the first spring seat 426 and the second spring seat 428, and so the second distance L2 equals the current spring length. Based on this, the orientation of one or both of the links 500, 502 relative to each other or relative to the first member 416 or second member 418 can be used to measure the spring length.

To this end, a position sensor 510 is operatively connected to the linkage 442 to determine the positions of one or both links 500, 502. FIG. 5 shows two examples of position sensors 510. Sensor 510a is an angular potentiometer. Angular potentiometers are known devices that have a resistive element surrounding a rotatable shoe. One end of the resistive element and the shoe are attached to electrical outputs, such that changing the position of the shoe changes the resistance of the circuit formed between the outputs. In this case, the angular potentiometer 510a is attached at the first member 416 and first link 500 at the first pivot 504. As the first link 500 rotates relative to the first member 416, the resistance of the angular potentiometer 510a varies. When connected to a conventional voltage-sensing circuit, the resistance of the potentiometer 510a can be detected as a voltage that varies as a function of the relative angle between the first member 416 and the first link 500. Through routine calibration or initial design, the output voltage of the potentiometer 510a can be correlated with the first distance L1 and/or second distance L2. Thus, the angular potentiometer 510a can be used to generate an output indicative of a relative position between the first member 416 and the second member 418.

FIG. 5 also shows another example of a position sensor in the form of a linear potentiometer 510b. Linear potentiometers are also known devices, that have a variable resistance as a function of length. In this case the linear potentiometer 510b is connected between the first link 500 and the second link 502, and can be used to generate an output signal indicative of the first distance L1 and/or the second distance L2. It will be appreciated that an angular potentiometer 510a could alternatively be used at any of the pivots 504, 506, 508, or a linear potentiometer 510b could alternatively be used between either link 500, 502 and the first or second member 416, 418. It will also be appreciated that other kinds of sensor could be used to determine the orientations of the parts. For example a first angular accelerometer or level gauge may be positioned on the first member 416, and a second angular accelerometer or level gauge may be positioned on the first link 500, and their outputs correlated to determine a relative angle between the parts.

While the linkage 442 may measure direct extension of the spring between the first member 416 and second member 418, it is also possible to measure the displacement of the second member 418 relative to any other known fixed position. For example, FIG. 5 shows another alternative example of a position sensor 510c in the form of an angular potentiometer mounted on the feeder housing frame 518, actuator body, housing sidesheet, and so on, via a link 516. In this case, the spring extension can be measured by accounting for the geometric relationship between the fixed position and the second member 418 using conventional trigonometric functions or the like.

It will also be appreciated that the second distance L2 may be correlated to the output signal of the position sensor using any suitable method or system. In one example, the voltage output of an angular potentiometer 510a may be correlated with a lookup table stored in a memory, with the lookup table identifying second distance L2 values as a function of output voltage. In another example, a mathematical correlation may be made between the output voltage and the second distance L2, and used to calculate the second distance L2 without the need for a lookup table. Other alternatives and variations will be apparent to persons of ordinary skill in the art in view of the present disclosure.

Still referring to FIG. 5, the telescoping assembly 202 also may include additional useful features. For example, a travel stop 512 may be provided to limit the motion of the first member 416 relative to the second member 418 at the retracted position. In this case, the travel stop 512 comprises an end of the bore 432, which is dimensioned to contact the first member 416 to stop further contraction of the telescoping assembly 202. The position of the travel stop 512 may be selected to prevent the spring 424 from reaching its minimum collapsed length (i.e., the length at which the coils all contact each other to prevent further compression). For example, the travel stop 512 may be spaced from the second spring seat 428 by a third distance L3, which is greater than the minimum collapsed length of the spring 424. Thus, when the travel stop 512 contacts the first member 416 at the first spring seat 426, the distance between the first spring seat 426 and the second spring seat 428 is equal to the third distance L3, and is greater than the minimum collapsed length of the spring 424.

FIG. 5 also shows an optional load cell 514 within the load path of the telescoping assembly 202 (e.g., between the spring seat 428 and the second end 422). The load cell 514 may comprise any suitable force measuring transducer or the like, as known in the art. The load cell 514 may be used to calibrate an initial load on the system when the spring force and actuator force are in equilibrium, or to provide other functions, such as real-time monitoring of load variations. The load cell 514 can also be used as a substitute for the linkage 442 and position sensor 510, by using the measured force output to control the actuator 200.

Figure 6:
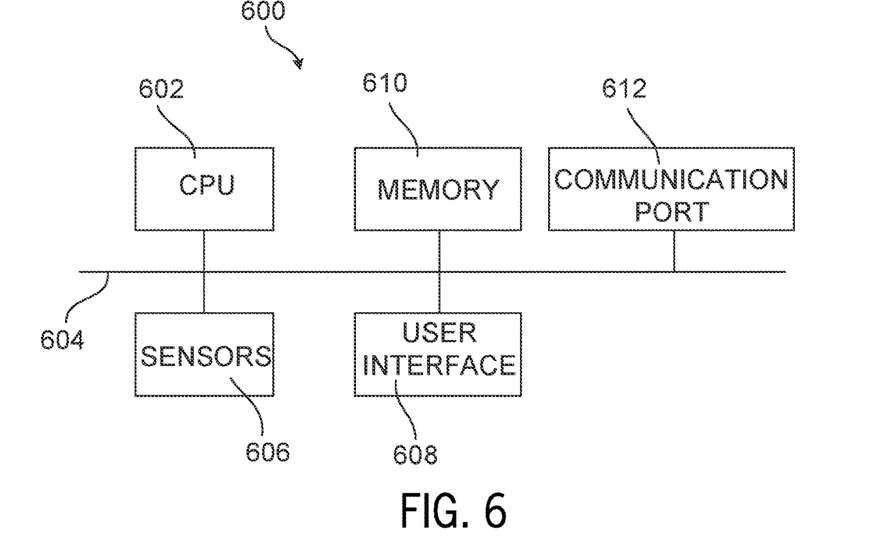
FIG. 6 is a schematic illustration of an exemplary feeder assembly tension control system.

FIG. 6 is a block diagram of exemplary hardware and computing equipment that may be used as a control system 600 to control the operation of the actuator 200. The control system 600 includes a central processing unit (CPU) 602, which is responsible for performing calculations and logic operations required to execute one or more computer programs or operations. The CPU 602 is connected via a data transmission bus 604, to sensors 606 (e.g., load cells 302), a user interface 608, and a memory 610. The user interface 608 may comprise any suitable device for providing user input to or output from the control system 600, such as toggle switches, dials, digital switches, touchscreen displays, and the like. The control system 600 also has a communication port 612 that may be operatively connected (wired or wirelessly) to a remote system for monitoring, updating or controlling the control system 600. One or more analog to digital conversion circuits may be provided to convert analog data from the sensors 606 to an appropriate digital signal for processing by the CPU 602, and signal conditioning circuits may be used to filter or perform other functions on the raw data, as known in the art.

The CPU 602, data transmission bus 604 and memory 606 may comprise any suitable computing device, such as an INTEL ATOM E3826 1.46 GHz Dual Core CPU or the like, being coupled to DDR3L 1066/1333 MHz SO-DIMM Socket SDRAM having a 4 GB memory capacity or other non-transitory memory (e.g., compact disk, digital disk, solid state drive, flash memory, memory card, USB drive, optical disc storage, etc.). The CPU 602 also may comprise a circuit on a chip, microprocessor, or other suitable computing device. The selection of an appropriate processing system and memory is a matter of routine practice and need not be discussed in greater detail herein. The control system 600 may be integrated into an existing vehicle control system, added as a new component, or be a self-contained system.

It is to be understood that operational steps performed by the control system 600 may be performed by the controller upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller described herein is implemented in software code or instructions which are tangibly stored on a tangible computer readable medium. Upon loading and executing such software code or instructions by the controller, the controller may perform any of the functionality of the controller described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Figure 7:
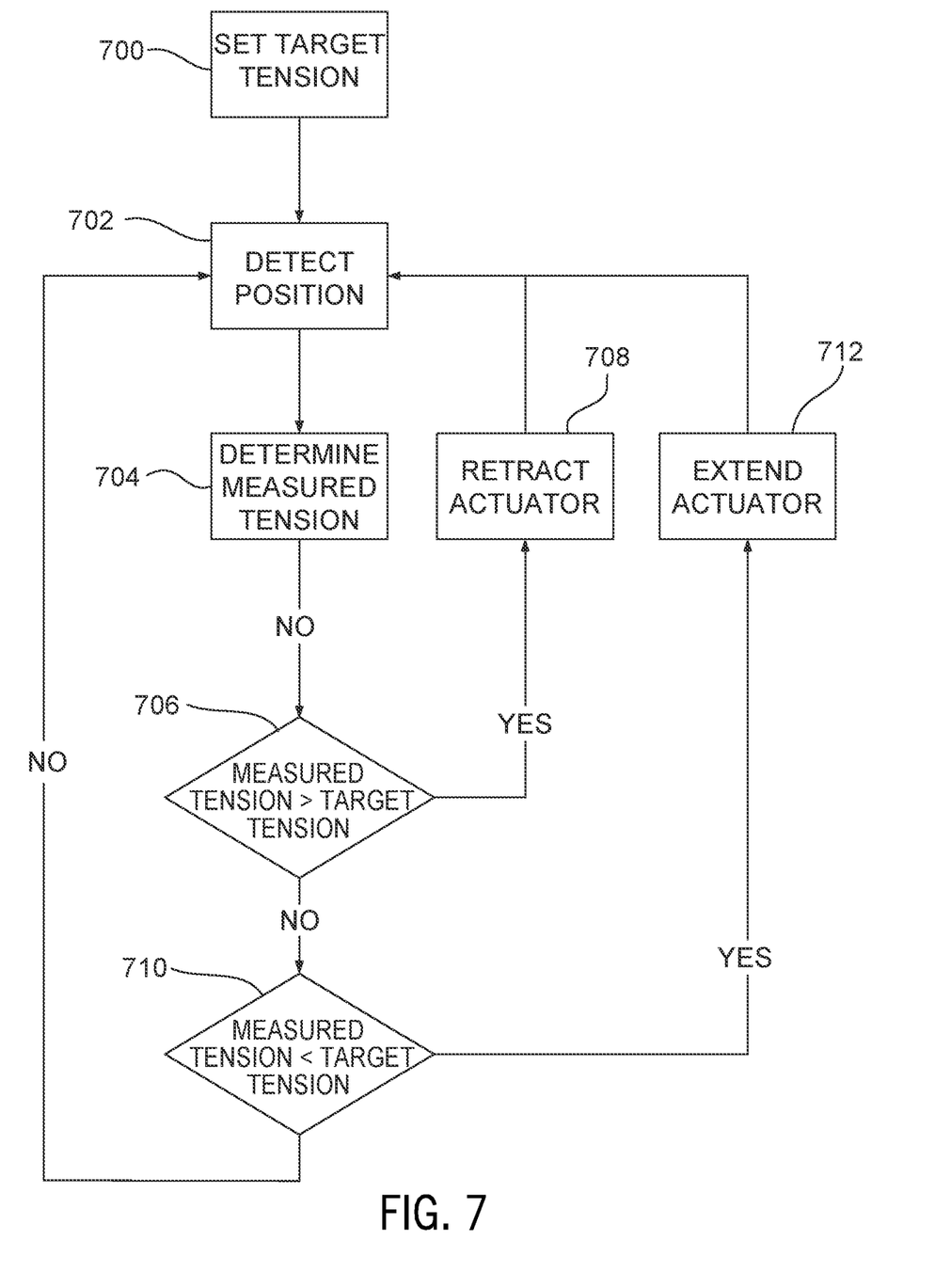
FIG. 7 is a flow chart illustrating an exemplary method for operating the control system of FIG. 6.

FIG. 7 illustrates an exemplary control process that may be implemented by the control system 600. At step 700, the operator sets a target tension based on operating conditions, or the control system may select a target tension based on design parameters or other information associated with the feeder assembly 108. At step 702, the control system 600 queries the position sensor 510 to obtain an output signal indicative of the second distance L2, which is assumed to equal the spring length. At step 704, the control system 600 uses the output signal to determine the current operating force on the spring, and from this estimates the measured tension on the chains 114. At step 706, the control system compares the measured tension with the target tension value. If the measured tension is higher than the target tension, the control system retracts the actuator 200 to reduce the tension. If the measured tension is not greater than the target tension, the control system determines, in step 710, whether the measured tension is less than the target tension. If so, the control system extends the actuator 202 to increase the tension. Thus, the control system is operable to maintain a distance between the first spring seat and the second spring seat at a constant value to maintain the tension force exerted by the spring 424 at a constant value (of course, some continuous variations would be expected in actual operation of the feeder assembly 108 due to variations in crop loading and other dynamic factors).

Operation of a hydraulic actuator 200 may be achieved using any suitable hydraulic circuit, such as an electrically-controlled pressure relief valve or the like. Operation of other kinds of actuators 200, such as electric motor-driven actuators, may be achieved using suitable control circuits, as known in the art.

The foregoing process may be modified in various ways. For example, step 706 may be modified to require the measured tension to exceed the target tension by a predetermined value before moving to step 708. This can be useful to prevent adjustments to account for transient high loads that are not expected to require correction. Similarly, step 706 may be modified to require the measured tension to be below the target tension by a predetermined amount before moving to step 712. The process also may include steps to provide user feedback or alarms. For example, if the measured tension drops rapidly, it may indicate a broken chain, and an alarm may be signaled to the operator. Also, if the actuator is not able to move far enough to maintain the desired tension, the process may include an alarm indicating that the chain or other parts are worn beyond their useful life. It will also be understood that the foregoing process may incorporate any suitable control algorithm may be used, such as proportional control, proportional-integral-derivative ("PID") control, or the like. Other alternatives and variations will be apparent to persons of ordinary skill in the art in view of the present disclosure.

As another example, in an embodiment in which a load cell 514 is used instead of a position sensor, the control system 600 may operate by maintaining the desired tension force via a relatively direct force measurement. As the chains 114 or other flexible drives stretch, the front drum 124 moves away from the fixed end of the actuator 200, and the load measured by the load cell 514 decreases because the spring length increases. When the load output of the load cell 514 falls below a threshold value, the control system 600 may extend the actuator 200 to raise the load output back to a desired value or range. Using force output in this manner, without a direct distance measurement by a position sensor 510, does not indicate the total amount of stretch in the chain 114. However, the amount of stretch may be estimated by counting the number of times the actuator 200 is extended and using this to estimate total stretch or remaining service life.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. A feeder conveyor system comprising:
   a frame;
   an actuator having a fixed element attached at a mounting point to the frame, and a movable element having an output interface, the movable element being connected to the fixed element and movable between a retracted actuator position in which the output interface is relatively close to the mounting point, and an extended actuator position in which the output interface is relatively far from the mounting point; and
a telescoping assembly comprising:
   a first member having a first end connected to the output interface to move with the output interface, and a first spring seat,
   a second member slidably connected to the first member and having a second end and a second spring seat, the second member being movable relative to the first member between a retracted telescoping assembly position in which the second end is relatively close to the first end, and an extended telescoping assembly position in which the second end is relatively far from the first end,
   a spring operatively connected between the first spring seat and the second spring seat,
   a linkage operatively connected between the first member and the second member, and
   a position sensor operatively connected to the linkage and configured to generate an output signal indicative of a relative position between the first member and the second member.

2. The feeder conveyor system of claim 1, further comprising a first flexible drive support assembly movably mounted to the frame and connected to the second end of the second member to move with the second member.

3. The feeder conveyor system of claim 2, further comprising:
   a second flexible drive support assembly attached to the frame at a second mounting point; and
   a continuous flexible drive assembly extending around the first flexible drive support assembly and the second flexible drive support assembly.

4. The feeder conveyor system of claim 3, wherein:
   the first flexible drive support assembly comprises a drum;
   the second flexible drive support assembly comprises a plurality of first sprockets;
   the continuous flexible drive assembly comprises a plurality of continuous chains, each extending around a respective one of the plurality of first sprockets and the drum; and
   the continuous flexible drive assembly comprises a plurality of slats, each of the plurality of slats being connected to at least two of the plurality of continuous chains.

5. The feeder conveyor system of claim 1, wherein the actuator comprises a hydraulic actuator and one of the fixed element and the movable element comprises a cylinder and the other of the fixed element and the movable element comprises a piston having an end slidably movable with an end of the piston in the cylinder.

6. The feeder conveyor system of claim 1, further comprising a travel stop positioned to stop relative movement of the first member relative to the second member at the retracted telescoping assembly position.

7. The feeder conveyor system of claim 6, wherein the spring comprises a coil spring having a minimum collapsed length, and the travel stop is positioned to prevent a distance between the first spring seat and the second spring seat from being less than the minimum collapsed length.

8. The feeder conveyor system of claim 1, wherein the linkage comprises a first link, a second link, a first pivot joining the first link to one of the first member and the second member, a second pivot joining the first link to the second link, and a third pivot joining the second link to the other of the first member and the second member.

9. The feeder conveyor system of claim 8, wherein the position sensor comprises a potentiometer connected between the first link and the one of the first member and the second member and wherein the output signal comprises a voltage value that varies corresponding to an angular orientation of the first link relative to the one of the first member and the second member.

10. The feeder conveyor system of claim 1, further comprising a controller configured to operate the actuator based on the output signal.

11. The feeder conveyor system of claim 10, wherein the controller is configured to operate the actuator to maintain a distance between the first spring seat and the second spring seat at a constant value.

12. An agricultural vehicle comprising:
   a chassis configured for movement on a surface;
   a header configured to gather crop material from the surface; and
   a feeder assembly operatively connected between the header and the chassis and configured to convey the crop material from the header to the chassis, the feeder assembly comprising:
      a frame,
      an actuator having a fixed element attached at a mounting point to the frame, and a movable element having an output interface, the movable element being connected to the fixed element and movable between a retracted actuator position in which the output interface is relatively close to the mounting point, and an extended actuator position in which the output interface is relatively far from the mounting point,
      a telescoping assembly comprising:
         a first member having a first end connected to the output interface to move with the output interface, and a first spring seat,
         a second member slidably connected to the first member and having a second end and a second spring seat, the second member being movable relative to the first member between a retracted telescoping assembly position in which the second end is relatively close to the first end, and an extended telescoping assembly position in which the second end is relatively far from the first end,
         a spring operatively connected between the first spring seat and the second spring seat,
         a linkage operatively connected between the first member and the second member, and
         a position sensor operatively connected to the linkage and configured to generate an output signal indicative of a relative position between the first member and the second member,
      a first flexible drive support assembly movably mounted to the frame and connected to the second end of the second member to move with the second member,
      a second flexible drive support assembly attached to the frame at a second mounting point, and
      a continuous flexible drive assembly extending around the first flexible drive support assembly and the second flexible drive support assembly.

13. The feeder conveyor system of claim 12, wherein:
   the first flexible drive support assembly comprises a drum;
   the second flexible drive support assembly comprises a plurality of first sprockets;

the continuous flexible drive assembly comprises a plurality of continuous chains, each extending around a respective one of the plurality of first sprockets and the drum; and the continuous flexible drive assembly comprises a plurality of slats, each of the plurality of slats being connected to at least two of the plurality of continuous chains.

14. The feeder conveyor system of claim 12, wherein the actuator comprises a hydraulic actuator and one of the fixed element and the movable element comprises a cylinder and the other of the fixed element and the movable element comprises a piston having an end slidably movable with an end of the piston in the cylinder.

15. The feeder conveyor system of claim 12, further comprising a travel stop positioned to stop relative movement of the first member relative to the second member at the retracted telescoping assembly position.

16. The feeder conveyor system of claim 15, wherein the spring comprises a coil spring having a minimum collapsed length, and the travel stop is positioned to prevent a distance between the first spring seat and the second spring seat from being less than the minimum collapsed length.

17. The feeder conveyor system of claim 12, wherein the linkage comprises a first link, a second link, a first pivot joining the first link to one of the first member and the second member, a second pivot joining the first link to the second link, and a third pivot joining the second link to the other of the first member and the second member.

18. The feeder conveyor system of claim 17, wherein the position sensor comprises a potentiometer connected between the first link and the one of the first member and the second member and wherein the output signal comprises a voltage value that varies corresponding to an angular orientation of the first link relative to the one of the first member and the second member.

19. The feeder conveyor system of claim 12, further comprising a controller configured to operate the actuator based on the output signal.

20. The feeder conveyor system of claim 19, wherein the controller is configured to operate the actuator to maintain a distance between the first spring seat and the second spring seat at a constant value.

* * * * *

UNITED STATES PATENT AND TRADEMARK OFFICE
CERTIFICATE OF CORRECTION

PATENT NO. : 11,839,176 B2
APPLICATION NO. : 18/026938
DATED : December 12, 2023
INVENTOR(S) : Nathan E. Isaac and Steven E. Gaedy It is certified that error appears in the above-identified patent and that said Letters Patent is hereby corrected as shown below:

In the Claims

At Claim 13, Column 12, Line 63, "feed conveyor system" should read -- agricultural vehicle --;
At Claim 14, Column 13, Line 9, "feed conveyor system" should read -- agricultural vehicle --;
At Claim 15, Column 13, Line 15, "feed conveyor system" should read -- agricultural vehicle --;
At Claim 16, Column 13, Line 18, "feed conveyor system" should read -- agricultural vehicle --;
At Claim 17, Column 14, Line 1, "feed conveyor system" should read -- agricultural vehicle --;
At Claim 18, Column 14, Line 7, "feed conveyor system" should read -- agricultural vehicle --;
At Claim 19, Column 14, Line 15, "feed conveyor system" should read -- agricultural vehicle --;
At Claim 20, Column 14, Line 18, "feed conveyor system" should read -- agricultural vehicle --.

Signed and Sealed this
Twelfth Day of November, 2024

Katherine Kelly Vidal
*Director of the United States Patent and Trademark Office*